United States Patent [19]

Soula et al.

[11] 4,273,915

[45] Jun. 16, 1981

[54] PROCESS FOR THE PREPARATION OF GLYCIDYL POLYETHERS OF POLYPHENOLS

[75] Inventors: Gérard Soula, Meyzieu; Jean-Louis Locatelli, Vienne, both of France

[73] Assignee: Rhone-Poulenc Industries, Paris, France

[21] Appl. No.: 125,777

[22] Filed: Feb. 29, 1980

[30] Foreign Application Priority Data

Mar. 2, 1979 [FR] France .................. 79 05919

[51] Int. Cl.³ .............................................. C08G 59/06
[52] U.S. Cl. .................................. 528/93; 260/348.15; 528/111
[58] Field of Search .................. 260/348.15; 528/93, 528/111

[56] References Cited

U.S. PATENT DOCUMENTS 3,350,353  10/1967  Alvey ........................ 528/93 X

OTHER PUBLICATIONS

Rokicki et al., "The Synthesis of Epoxy Resins in Dipolar, Aprotic Solvents", Die Makromolekulare Chem. 179, 1661-1671 (1978).

*Primary Examiner*—Earl A. Nielsen
*Attorney, Agent, or Firm*—Burns, Doane, Swecker & Mathis

[57] ABSTRACT

The invention provides a novel process for the preparation of glycidyl polyethers of polyphenols. The process comprises reacting at least one alkali metal salt of a polyphenol with at least one 2,3-epoxy-1-haloalkane in an anhydrous and essentially aprotic medium, in the presence of a compound of the formula $$N[CHR_1-CHR_2-O-(CHR_3-CHR_4-O)_n-R_5]_3$$

wherein n is an integer of from 0 to 10 inclusive; $R_1$, $R_2$, $R_3$ and $R_4$, which can be the same or different, are each a hydrogen atom or an alkyl radical having 1 to 4 carbon atoms; $R_5$ is a hydrogen atom, an alkyl radical having 1 to 12 carbon atoms, a cycloalkyl radical having 3 to 12 carbon atoms, a phenyl radical, a

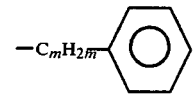

radical or a

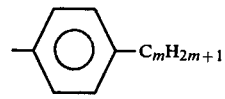

radical; and m is an integer from 1 to 12 inclusive.

The process is especially useful in the preparation of glycicyl polyethers of bisphenol A.

26 Claims, No Drawings

PROCESS FOR THE PREPARATION OF GLYCIDYL POLYETHERS OF POLYPHENOLS

BACKGROUND OF THE INVENTION

1. Field of the Invention

The present invention provides a process for the preparation of glycidyl polyethers of polyphenols using alkali metal salts of polyphenols and 2,3-epoxy-1-haloalkanes as starting materials, and employing a selected group of reaction catalysts.

2. Discussion of the Prior Art

The glycidyl polyethers of polyphenols are more commonly known as "epoxy resins". The resins constitute a class of products characterized by the presence of recurring oxirane units,

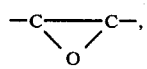

which lead, after cross linking, to systems with properties that are remarkable in various respects. This has contributed greatly to the development of this type of resins in numerous fields of application.

Among these resins, those conventionally obtained by the reaction of bisphenol A [i.e., 2,2-bis(4-hydroxyphenyl)propane or 4,4'-isopropylidenediphenol] and epichlorohydrin (i.e. 1-chloro-2,3-epoxypropane) are of particular interest. It is therefore the object of the present invention to provide a process for the preparation of glycidyl ethers, particularly of bis-phenol A, by the reaction in an anhydrous and aprotic medium of alkali metal salts of polyphenols with 2,3-epoxy-1-haloalkanes. Another object of the invention is to provide a process for the preparation of resins having a viscosity, measured at 25° C., of less than or equal to 100 poises. This type of resin is conventionally prepared by the reaction of bisphenol A with epichlorohydrin in the presence of water and an alkaline agent. Numerous processes are described in the prior art.

For example, U.S. Pat. No. 2,801,227 teaches a process for the preparation of diglycidyl ethers of polyphenols. This process consists of adding an aqueous solution of an alkaline hydroxide to a polyphenol solution in epichlorohydrin at a rate of at least 3 moles of the epichlorohydrin per hydroxyl equivalent of the phenol. The water and part of the epichlorohydrin are distilled from the medium.

In this process, it is essential to control the velocity of the introduction of the alkaline hydroxide solution and the velocity of the distillation so that the reaction medium contains 0.3 to 2% by weight of water. The reaction between the epichlorohydrin and the polyphenol takes place at a temperature of the order of 120° C. In practice, all of the alkaline hydroxide (sodium hydroxide) is only added by the end of 3 to 5 hours. The excess epichlorohydrin is then eliminated by distillation and a solvent is introduced in the reaction medium so as to separate the resin from the salt (sodium chloride) formed.

Another type of process is based on having the alkaline agent play a double role in the envisioned synthesis: a catalytic role to facilitate the condensation of the polyphenol and the epichlorohydrin, and a role as a dehydrochlorination agent to convert the "chlorohydrin" groups into oxirane groups. Such processes are effected in two stages. Thus, French Pat. No. 1,336,444 describes a two stage process whereby a mole of bisphenol A is contacted with at least 10 moles of epichlorohydrin at a temperature of the order of 65° C. in a first stage, while adding progressively, or by increment, an aqueous solution of 50% sodium hydroxide, over a period extending from 2 to 4 hours, the quantity of sodium hydroxide introduced during this stage being less than 16% of the total amount required, this total amount being 2 moles of sodium hydroxide per mole of bisphenol A used.

Distillation then eliminates the water in the form of its azeotrope with epichlorohydrin; in this manner therefore only a portion of the epichlorohydrin is eliminated from the reaction medium.

In the second stage, dehydrochlorination of the remaining epichlorohydrin is effected at about 99° C. by adding the remaining amount of the sodium hydroxide as the dehydrochlorination agent, in the form of pellets. After about an hour, the excess epichlorohydrin is removed by distillation. The resin obtained is then dissolved in a solvent and washed with water. Two phases are obtained, an aqueous phase containing the sodium chloride formed and an organic phase containing the resin. The phases are separated and the organic phase is again treated, for about one hour at approximately 90° C., with sodium hydroxide pellets. The resin is then recovered by various operations of washing, neutralization and drying.

These processes are extremely difficult in operation. Thus, they require relatively long reaction periods, strict control of the different reaction conditions and numerous stages for purifying and/or recovering the resin desired. Furthermore, the loss of epichlorohydrin, which is necessarily used in excess, is significant even if the greatest possible care is taken in the operation of this type of process.

Very recently, certain authors have envisioned another way to obtain this type of resin. Thus, (See MAKROMOL. CHEM. 179, 7, 1661–1671, 1978) it has been suggested that the synthesis of these resins be performed from alkali metal salts of certain diphenols and 2,3-epoxy-1-haloalkanes, in an anhydrous and aprotic medium. However, the reaction is limited by the difficulty encountered in solubilizing the diphenol alkali metal salts. In fact, large amounts of dimethylsulfoxide must be used to render the medium homogeneous; this hinders the development of such a method on an industrial scale.

BRIEF SUMMARY OF THE INVENTION

It has now been discovered that glycidyl ethers of polyphenols may be prepared from alkali metal salts of polyphenols and 2,3-epoxy-1-haloalkanes in an anhydrous and essentially aprotic medium, without being forced to render the medium homogeneous, provided that the process is performed in the presence of one or more catalysts as defined hereinafter.

The process according to the invention makes it possible to obtain, by a relatively simple and rapid method, epoxy resins having very good characteristics.

According to the invention, at least one alkali metal salt of a polyphenol is reacted with at least one 2,3-epoxy-1-haloalkane, in the presence of a catalytic quantity of at least one compound of the formula:

$$N[CHR_1-CHR_2-O-(CHR_3-CHR_4-O)_n-R_5]_3 \qquad (I)$$

wherein n is an integer from 0 to 10 inclusive; $R_1$, $R_2$, $R_3$ and $R_4$, which can be the same or different, are each a hydrogen atom or an alkyl radical having 1 to 4 carbon atoms; $R_5$ is a hydrogen atom, an alkyl radical having 1 to 12 carbon atoms, a cycloalkyl radical having 3 to 12 carbon atoms, a phenyl radical, a radical of the formula

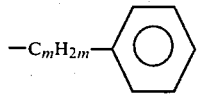

or a radical of the formula

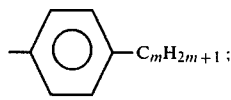

and m is an integer from 1 to 12 inclusive.

DETAILED DESCRIPTION OF THE PREFERRED EMBODIMENTS

Preferred compounds of formula (I) for use as catalysts in the process of this invention are the compounds wherein $R_1$, $R_2$, $R_3$ and $R_4$, which can be the same or different, each represent a hydrogen atom or a methyl radical, with $R_5$ and n having the significance given hereinabove. A particularly preferred class of catalysts for use in the present process consists of compounds of formula (I) wherein n is greater than or equal to 1 and less than or equal to 3 and $R_5$ represents a hydrogen atom or an alkyl radical having 1 to 4 carbon atoms. The catalysts of formula (I) wherein n is greater than or equal to 1 and less than or equal to 3; $R_1$, $R_2$, $R_3$ and $R_4$ each represent hydrogen; and $R_5$ represents a hydrogen atom or, even more preferably, an alkyl radical having 1 to 4 carbon atoms, are most especially suitable for use in the process according to the invention.

The following may be cited as representative compounds of formula (I) useful in the present process:

(a) tris(5-hydroxy-3-oxapentyl)amine of the formula:

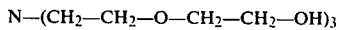

(b) tris(3-oxaheptyl)amine of the formula:

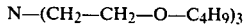

(c) tris(3,6-dioxaheptyl)amine of the formula:

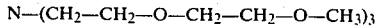

(d) tris(3,6,9-trioxadecyl)amine of the formula:

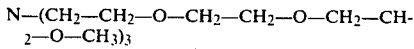

(e) tris(3,6-dioxaoctyl)amine of the formula:

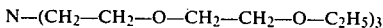

(f) tris(3,6,9-trioxaundecyl)amine of the formula:

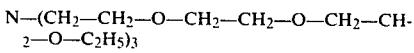

(g) tris(3,6-dioxanonyl)amine of the formula:

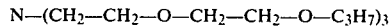

(h) tris(3,6,9-trioxadodecyl)amine of the formula:

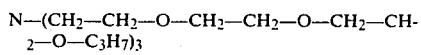

(i) tris(3,6-dioxadecyl)amine of the formula

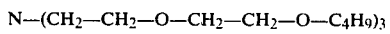

(j) tris(3,6,9-trioxatridecyl)amine of the formula:

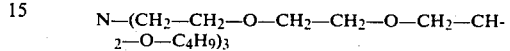

(k) tris(4-methyl-3,6-dioxaheptyl)amine of the formula:

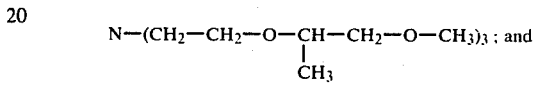

and (l) tris(2,4-dimethyl-3,6-dioxaheptyl)amine of the formula:

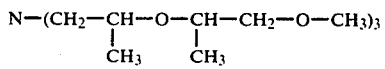

The compounds of formula (I) above can be prepared by the condensation of an alkali metal salt of the formula:

$$R_5(O-CHR_4-CHR_3)_n-OM \qquad (II)$$

wherein $R_3$, $R_4$, $R_5$ and n are defined as hereinabove and M is an alkali metal atom chosen from among sodium, potassium and lithium, with an amine of the general formula:

$$N(CHR_1-CHR_2-X)_3 \qquad (III)$$

wherein $R_1$ and $R_2$ are defined as hereinabove and X represents chlorine or bromine, or with the corresponding hydrochloride or hydrobromide, the molar ratio of the salt of the alkali metal to the amine being between approximately 3 and approximately 5.

The condensation reaction is effected at a temperature between 100° and 150° C. for about 1 to about 15 hours in the presence of a suitable solvent which can be, for example, chlorobenzene, but preferably is the hydroxyl compound corresponding to the initial alkali metal salt, i.e., the compound obtained by replacing the atom of the alkali metal (M) in formula (II) above with a hydrogen atom.

Preferably, the reaction is carried out in a solution containing from about 2 to about 5 moles of the alkali metal salt per liter of solvent.

The mixture obtained at the end of the reaction contains principally the tertiary amine of formula (I); it also contains a small proportion of the corresponding secondary amine and traces of the primary amine.

In the process according to the invention, it is possible to use directly the above-described mixture obtained after the first distillation, i.e. including the three types of amines.

Preferably, however, the above-described mixture is subjected to a more extensive distillation so as to obtain an essentially pure tertiary amine.

The process according to the invention requires the use of at least one polyphenol alkali metal salt. The expression of "polyphenol alkali metal salts" signifies the compounds of the formula

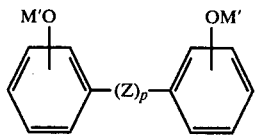

wherein p is equal to 0 or 1, M' represents an atom of an alkali metal selected from among lithium, sodium, potassium and cesium (M' preferably being a sodium or potassium atom) and Z represents a divalent radical chosen from the group consisting of the radicals —SO$_2$—,

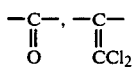

and the radicals of the formula

wherein R$_6$ is a hydrogen atom or a methyl radical, and R$_7$ represents a monovalent radical chosen from the group consisting of hydrogen, methyl, ethyl, tert-butyl, trichloromethyl,

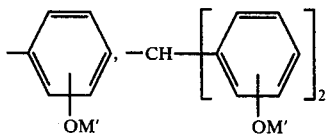

and

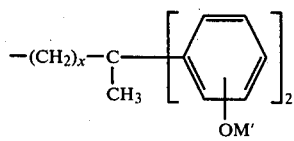

wherein x is 0, 1 or 2, and M' is defined as hereinabove.

Exemplary of the polyphenols that may be used in the form of their alkali metal salts in the process of the present invention are the following:
4,4'-dihydroxydiphenyl
4,4'-dihydroxydiphenylsulfone
2,4'-dihydroxydiphenyldimethylmethane
4,4'-dihydroxydiphenylmethane (bisphenol F)
1,1-bis(4-hydroxyphenyl)ethane
1,1-bis(4-hydroxyphenyl)isobutane
2,2-bis(4-hydroxyphenyl)propane (bisphenol A)
2,2-bis(4-hydroxyphenyl)butane
2,2-bis(2-hydroxyphenyl)propane
2,2-bis(4-hydroxyphenyl)-1,1,1-trichloroethane
2,2-bis(4-hydroxyphenyl)-1,1-dichloroethylene
tris(4-hydroxyphenyl)methane
1,1,2,2-(p-hydroxyphenyl)ethane
2,2,3,3-tetrakis(4'-hydroxyphenyl)butane
2,2,4,4-tetrakis(4'-hydroxyphenyl)pentane
2,2,5,5-tetrakis(4'-hydroxyphenyl)hexane The process according to the invention also envisions the use of alkali metal salts of polycyclic phenols wherein the hydrogen atoms of the ring are replaced in part by halogen atoms or alkyl radicals. Such polycyclic phenols include, for example, 2,2-bis(3,5-dibromo-4-hydroxyphenyl)propane, 2,2-bis-(3,5-dichloro-4-hydroxyphenyl)propane, 2,2-bis(4-hydroxy-2-methylphenyl)propane, 2,2-bis(2-hydroxy-4-tert-butylphenyl)propane and 2,2-bis(2-chloro-4-hydroxyphenyl)propane.

The process according to the invention equally envisions use of alkali metal salts of more complex polycyclic phenols, such as the novolak resins. These resins are obtained by condensation, in the presence of acid catalysts, of phenol or of cresol with aldehydes such as formaldehyde, acetaldehyde, crotonaldehyde, and the like.

According to the present invention, mixtures of two or more of alkali metal salts of polyphenols, i.e., a mixture of two or more compounds differing in the nature of the alkali metal cation and/or derived from two or more distinct polyphenols, can be used.

According to a preferred mode of embodiment of the present invention, one employs an alkali metal salt of a diphenol or a mixture of two or more alkali metal salts of diphenols, wherein the salts may differ by the nature of the alkali metal cation and/or may be derived from two or more distinct diphenols. Preferably, the sodium or potassium salts of one or several diphenols, in particular the salts of diphenols chosen from the group consisting of bisphenol A, bisphenol F, 2,2-bis(4-hydroxyphenyl)-1,1-dichloroethylene and 2,2-bis(3,5-dibromo-4-hydroxyphenyl)propane, are used.

According to a preferred variation of the invention, the alkali metal salts of bisphenol A and/or bisphenol F, and more particularly, the sodium or potassium salts thereof, are used.

The sodium salts of bisphenol A and or of bisphenol F are especially suitable for use in the practice of the present invention. Most particularly preferred is the sodium salt of bisphenol A.

The amount of catalyst, i.e. compound of formula (I), to be applied is not critical. Good results are observed when at least 0.05 equivalents of a compound of formula (I) are employed per 100 equivalents of OM' groups originating in the alkali metal polyphenol salts. There is no particular advantage to be gained from using more than 5 equivalents per 100 equivalents of the (OM') groups. Preferably, 0.25 to 2.5 equivalents of the compound of formula (I) are used per 100 equivalents of OM' groups.

According to a preferred embodiment of the present invention, when potassium salts of polyphenols are employed, the compounds of formula (I) wherein R$_1$, R$_2$, R$_3$ and R$_4$ are each a hydrogen atom, R$_5$ is a hydrogen atom or, preferably, an alkyl radical having 1 to 4 carbon atoms, and n is greater than or equal to 2, are used, for example tris(3,6,9-trioxadecyl)amine.

According to an even more advantageous embodiment, sodium salts of polyphenols and the compounds of formula (I) wherein R$_1$, R$_2$, R$_3$ and R$_4$ each represent a hydrogen atom, R$_5$ represents a hydrogen atom or, preferably, an alkyl radical having 1 to 4 carbon atoms, and n is greater than or equal to 1, for example tris(3-oxa-5-hydroxypentyl)amine, tris(3,6-dioxaheptyl)a- mine, tris(3,6-dioxaoctyl)amine and tris(3,6,9-trioxadecyl)amine, are used.

Numerous 2,3-epoxy-1-haloalkanes are suitable for use in the process of the present invention. Exemplary of the appropriate epoxyhaloalkanes are 1-chloro-2,3-epoxypropane (more generally called epichlorohydrin), 1-bromo-2,3-epoxypropane, 1-chloro-2,3-epoxybutane, 1-chloro-2-methyl-2,3-epoxypropane and their mixtures. In a preferred embodiment of the present invention, epichlorohydrin is used.

The term "essentially aprotic medium" as used herein is defined as one including practically no protons, with exception of those potentially originating in certain catalysts.

Because the reaction medium must be anhydrous, it may be necessary to dry the reagents before use.

According to a first mode of embodiment of the present invention, at least one mole of 2,3-epoxy-1-haloalkane is used per gram equivalent of OM' groups originating in at least one alkali metal salt of a polyphenol initially charged, in an essentially aprotic medium. No particular advantage is observed when more than 13 moles of 2,3-epoxy-1-haloalkane per gram equivalent of OM' groups are used. Preferably, 1 to 5 moles of 2,3-epoxy-1-haloalkane are employed per gram equivalent of OM' groups.

Because the alkali metal salts of polyphenols are insoluble in 2,3-epoxy-1-haloalkanes, it is desirable to operate with adequate agitation.

According to a second mode of embodiment of the present invention, the alkali metal salt or salts are introduced progressively, for example in a number of equal or different fractions, more or less spaced in time, or continuously.

The temperature of the reaction is not critical and it is generally between about 50° and about 150° C. Below 50° C., the reaction is relatively slow and above 150° C. there is a risk of a more or less degradation of the resin obtained.

Preferably, the reaction temperature is between about 80° and about 120° C.

It has been found that the addition to the reaction medium of at least one aprotic, and preferably polar, organic compound has a favorable effect even when quantities of the order of a few percents by weight are present in the reaction medium. As examples of organic compounds that may be used in this manner in the process of the present invention are the following: N-methyl pyrrlidone, dimethylformamide, dimethylacetamide, dimethylsulfoxide, dipropylsulfoxide, tetramethylenesulfone, acetonitrile, propionitrile, benzonitrile and ethylene sulfide. In an exceptional case, some of these components will render the medium homogeneous, but this is not necessary in any of the cases. When operating in the presence of such an organic compound, good results are obtained even if the amount of 2,3-epoxy-1-haloalkane is less than or equal to 3 moles per gram equivalent of OM' groups; this represents a particularly advantageous embodiment of the present process. In general, an amount of the anhydrous, aprotic and polar organic compound of the order of 10% by weight is added to the reaction medium, with this amount representing preferably at least 30% by weight of the reaction medium. Larger quantities may be used; however, beyond 80% by weight, no particular advantage is observed.

According to an advantageous variation of the invention, the operation is performed with 10 to 80% by weight of acetonitrile, but preferably with less than 30% by weight of acetonitrile.

It is possible to conduct the present process under atmospheric pressure or under a nitrogen pressure of up to 20 bars.

The process according to the invention is particularly suitable for the preparation of liquid epoxy resins from epichlorohydrin and the alkali metal salts of bisphenol A and/or bisphenol F, especially the disodium salt of bisphenol A, in the presence of tris(3,6-dioxaheptyl)amine. This type of resin generally has a viscosity, measured at 25° C., of less than or equal to 100 poises, and an epoxy content per 100 g of the order of 0.5.

In order to further illustrate the present invention and the advantages thereof, the following specific examples are given, it being understood that same are intended only as illustrative and in nowise limitative.

Preparation of the disodium salt of bisphenol-A

Into a solution of 40 g sodium hydroxide and 200 cm$^3$ methanol, there was poured a solution of 114 g bisphenol-A and 144 cm$^3$ of methanol. The mixture was heated under reflux for 30 minutes and 70% of the methanol was then distilled off.

To the residual paste, 234 cm$^3$ toluene were added. The methanol/toluene azeotrope was then distilled off, followed by the distillation of the water/toluene azeotrope. The operation was terminated when the toluene alone distilled. Subsequently, the disodium salt of bisphenol-A (hereinafter referred to as sodium bisphenate) was filtered and dried in an oven under a pressure of 20 mm Hg and at 90° C. for 16 hours. The product obtained in this manner was employed in the preparation of the resins as described hereinafter.

The dipotassium salt of bisphenol-A (potassium bisphenate) was prepared in like manner.

Preparation of the catalysts (a) Preparation of tris-(3,6-dioxaheptyl)amine:

Into a three-necked 1 liter flask equipped with a mechanical agitator, a thermometer and cooling means, 380 g 2-methoxyethanol (5 moles) were introduced. 23 g sodium (1 mole) were introduced over the course of 3 hours while maintaining the temperature of the mixture at 40° C.

To the preceding mixture, 51.6 g tris-(2-chloroethyl)amine hydrochloride (0.215 mole) were added. The mixture was then heated under reflux of the 2-methoxyethanol ($\theta = 125°$ C.) for 12 hours and the solvent distilled off under reduced pressure. The excess sodium 2-methoxyethanolate was neutralized by addition of 11.6 cm$^3$ of aqueous (10 N) HCl. The sodium chloride was filtered and the solution distilled.

Tris-(3,6-dioxaheptyl)amine distilled between 165° C. and 180° C. under 0.5 mm Hg, and 49 g of product were obtained.

Tris-(3,6-dioxaoctyl)amine was prepared in like manner.

(b) Preparation of tris-(3,6,9-trioxadecyl)amine

Into a three-necked 1 liter flask equipped with a mechanical agitator, a condenser and a thermometer, 600 g of the monomethyl ether of diethylene glycol (3,6-dioxaheptan-1-ol) or 5 moles and, subsequently, 23 g sodium (1 mole) were incrementally introduced in small fractions to form sodium 3,6-dioxaheptanolate.

When the sodium was completely converted, 51.8 g tris-(2-chloroethyl)amine hydrochloride (0.215 mole) were added. The mixture was heated to 130° C. for 8 hours under agitation, then cooled and the excess sodium alcoholate neutralized with a 10% aqueous solution of hydrochloric acid. The 3,6-dioxaheptan-1-ol was removed by distillation at 130° C. under 20 mm Hg. The mixture obtained was filtered in order to remove the sodium chloride and the product was distilled. In this manner, 83 g tris-(3,6,9-trioxadecyl)amine was obtained; same distilled at 189° C. under 0.1 mm Hg.

(c) Preparation of tris-(3-oxa-5-hydroxypentyl)amine

Into a 3 liter flask, equipped with a mechanical agitator, a thermometer, a distillation head and a condenser and receiving flask therefor, 2200 g (35.5 moles or 2 liters) glycol and 218.5 g (5.35 moles) sodium hydroxide tablets (98%) were introduced.

The mixture was heated to 85° C. and the sodium hydroxide completely dissolved; the mixture was then heated to 125° C. under 20 mm Hg to remove most of the water formed (80 ml), whereupon 180 cm$^3$ glycol, distilling between 125° and 135° C., were recovered; 2262 g (approximately 2 liters) of a glycol solution containing 2.7 moles/1 sodium monoglycolate were obtained, which was subsequently cooled to 80° C. To 2262 g of the glycol solution of sodium monoglycolate prepared in this manner (5.35 moles of sodium monoglycolate), 280.4 g (1.16 mole) of tris-(2-chloroethyl)amine hydrochloride were added and the mixture was heated under reflux to 197° C. for 3 hours. Precipitation of sodium chloride was observed.

A large portion of the glycol (1450 ml) was then distilled under vacuum (at 100° C. under 3 mm Hg) for 4½ hours.

The contents of the flask were then filtered, the filter cake washed six times with 100 ml acetone and then dried.

270 g NaCl (in place of the theoretical 272 g) were obtained.

The excess sodium monoglycolate was neutralized with 0.7 mole (56.5 ml) hydrochloric acid (d=1.19). The acetone was evaporated and the resultant oily residue was distilled. The middle fraction of the distillation was recovered between 210°–220° C. under 2 mm Hg.

213 g of a clear, yellow liquid were recovered, which, after analysis, was determined to be tris-(3-oxa-5-hydroxypentyl)amine.

EXAMPLE 1

Into a glass reactor equipped with a central anchor agitator, a bulb condenser and a thermometer, the following were charged:
(i) 92.9 g (1 mole) epichlorohydrin, and
(ii) 1.6 g (5 m.mole) tris-(3,6-dioxaheptyl)amine.
The mixture was heated to 60° C. and 29.6 g (0.1 mole) anhydrous sodium bisphenate were added. The mixture was heated to 116° C. for 45 minutes. The suspension obtained in this manner was then filtered. The filtrate was washed twice with 80 cm$^3$ water. After decantation, the organic phase was evaporated at 100° C. under 20 mm Hg.

In this manner, 32.3 g of a liquid resin having the following characteristics were obtained:

| | | |
|---|---|---|
| Viscosity measured at 250° C. | : | 110 poise |
| Epoxy content per 100 g | : | 0.520 |
| Chlorine content | : | 0.5% |

The aqueous phase obtained after decantation was treated with methylene chloride. In this manner, 1 g of a product which after analysis was determined to be tris-(3,6-dioxaheptyl)amine was obtained.

EXAMPLE 2

The procedure of Example 1 was repeated but by charging only 46.5 g (0.5 mole) epichlorohydrin. In a 30 minute reaction, 33 g of a liquid resin having a viscosity, measured at 25° C., of 90 poises, was obtained.

EXAMPLE 3

Into the apparatus described hereinabove, the following were charged:
(i) 92.5 g (1 mole) epichlorohydrin, and
(ii) 0.32 g (1 mole) tris-(3,6-dioxaheptyl)amine.
The mixture was heated to 60° C. and 4.9 g anhydrous sodium bisphenate (first fraction) were added. The mixture was heated to 117° C. (epichlorohydrin reflux) and every five minutes a fraction of 4.9 g anhydrous sodium bisphenate were added. All together, 29.4 g (0.1 mole) of anhydrous sodium bisphenate were introduced in 6 fractions. The entire duration of the reaction was 1 hour. The reaction medium was a suspension which was filtered upon completion of the reaction. The filtrate was treated as indicated hereinabove. 26 g of a liquid resin having the following characteristics were obtained:

| | | |
|---|---|---|
| Viscosity measured at 25° C. | : | 74 poise |
| Epoxy content per 100 g | : | 0.528 |
| Chlorine content | : | 1.04% |

EXAMPLE 4

The procedure of Example 3 was repeated, but by utilizing 46.25 g (0.5 mole) epichlorohydrin. 24 g of a liquid resin having the following characteristics were obtained:

| | | |
|---|---|---|
| Viscosity measured at 25° C. | : | 35 poise |
| Epoxy content per 100 g | : | 0.529 |
| Chlorine content | : | 0.98% |

EXAMPLE 5

The procedure of Example 3 was repeated, but by utilizing only 18.5 g (0.2 mole) epichlorohydrin. 15 g of a liquid resin having the following characteristics were obtained:

| | | |
|---|---|---|
| Viscosity measured at 25° C. | : | 580 poise |
| Epoxy content per 100 g | : | 0.460 |
| Chlorine content | : | 0.59% |

EXAMPLE 6

The procedure was repeated as in Example 3, but utilizing:
46.25 g (0.5 mole) epichlorohydrin
0.45 g (1 m.mole) tris-(3,6,9-trioxadecyl)amine, and a total amount of 37.2 g (0.124 mole) anhydrous potassium bisphenate, which was introduced in six equal fractions every 10 minutes. The reaction lasted for 1 hour at 117° C.; 39 g of a liquid resin having the following characteristics were obtained:

| Viscosity measured at 25° C. | : | 225 poise |
|---|---|---|
| Epoxy content per 100 g | : | 0.493 |
| Chlorine content | : | 0.90% |

EXAMPLE 7

The procedure of Example 4 was repeated, but utilizing 0.36 g (1 m.mole) tris-(3,6-dioxaoctyl)amine; 28 g of a liquid resin having the following characteristics were obtained:

| Viscosity measured at 25° C. | : | 307 poise |
|---|---|---|
| Epoxy content per 100 g | : | 0.480 |
| Chlorine content | : | 0.61% |

EXAMPLE 8

Into the apparatus described in Example 1, the following were introduced:
(i) 92 g (1 mole) epichlorohydrin,
(ii) 78 cm$^3$ acetonitrile, and
(iii) 3 g (10 m.mole) tris-(3,6-dioxaheptyl)amine.
The reaction mass was heated to 60° C. and 54.5 g (0.2 mole) anhydrous sodium bisphenate were added thereto. A suspension was obtained which was heated to 83° C. (acetonitrile reflux) for 1 hours. The suspension was filtered and the filtrate evaporated under reduced pressure (20 mm Hg) while heated to 140° C.

57 g of a liquid resin having the following characteristics were obtained:

| Viscosity measured at 25° C. | : | 53 poise |
|---|---|---|
| Epoxy content per 100 g | : | 0.505 |
| Chlorine content | : | 0.50% |

EXAMPLE 9

The procedure of Example 8 was repeated, utilizing:
(i) 18.5 g (0.2 mole) epichlorohydrin,
(ii) 100 cm$^3$ acetonitrile,
(iii) 1.5 g (5 m.moles) tris-(3,6-dioxaheptyl)amine, and
(iv) 27.2 g (0.1 mole) anhydrous sodium bisphenate.
After 1 hour of reaction at 83° C., the suspension was filtered: the filtrate was evaporated under reduced pressure (20 mm Hg) at 80° C., then at 160° C. for 5 minutes. 10.3 g of a liquid, transparent and brown resin having the following characteristics were obtained:

| Viscosity measured at 25° C. | : | 80 poise |
|---|---|---|
| Epoxy content per 100 g | : | 0.553 |
| Chlorine content | : | 0.46% |

This resin was then dissolved in 30 cm$^3$ methylisobutylcetone and washed with 30 cm$^3$ water. The aqueous phase was decanted and, by means of methylene chloride, 1 g of product was extracted therefrom, which was shown by analysis to be tris-(3,6-dioxaheptyl)amine.

The organic phase was evaporated at 120° C. under 20 mm Hg and a light yellow resin was recovered.

EXAMPLE 10

Into the apparatus described in Example 1, the following were introduced:
(i) 23.2 g (0.25 mole) epichlorohydrin,
(ii) 19.5 cm$^3$ acetonitrile, and
(iii) 0.7 g (2.5 m.mole) tris-(3-oxa-5-hydroxypentyl)amine.
The mixture was heated to 60° C. and in 6 equal fractions, added incrementally (one fraction every 15 minutes), a total of 14.65 g (0.05 mole) anhydrous sodium bisphenate was introduced. The reaction continued for 90 minutes at 83° C.

By treating the suspension as described hereinabove, 17 g of a resin having the following characteristics were obtained:

| Viscosity measured at 25° C. | : | ~ 1000 poise |
|---|---|---|
| Epoxy content per 100 g | : | 0.472 |
| Chlorine content | : | 0.41% |

EXAMPLE 11

The procedure of Example 10 was repeated, but utilizing:
(i) 9.25 g (0.1 mole) epichlorohydrin,
(ii) 50 cm$^3$ acetonitrile,
(iii) 0.226 g (0.5 m.mole) tris-(3,6,9-trioxadecyl)amine, and
(iv) 18.95 g (0.05 mole) anhydrous potassium bisphenate.
The potassium bisphenate was incrementally added in 6 equal fractions, spaced 15 minutes apart.

After 90 minutes of reaction at 83° C., 8 g of a resin having the following characteristics were obtained:

| Viscosity measured at 25° C. | : | 200 poise |
|---|---|---|
| Epoxy content per 100 g | : | 0.492 |
| Chlorine content | : | 0.35% |

EXAMPLE 12

The procedure of Example 9 was repeated, but by incrementally introducing anhydrous sodium bisphenate in 6 equal fractions, spaced 15 minutes apart. After 90 minutes of reaction at 83° C., 4.5 g of a liquid resin having the following characteristics were obtained:

| Viscosity measured at 25° C. | : | 110 poise |
|---|---|---|
| Epoxy content per 100 g | : | 0.525 |
| Chlorine content | : | 0.8% |

EXAMPLE 13

Into a 1 liter, stainless steel autoclave, equipped with an anchor agitator, a thermometer and a manometer, the following were charged:
(i) 370 g (4 moles) epichlorohydrin,
(ii) 2.7 g (7.4 m.moles) tris-(3,6-dioxaoctyl)amine, and
(iii) 230 cm$^3$ acetonitrile.
The mixture was heated to 60° C. and 218 g (0.8 mole) anhydrous sodium bisphenate was added thereto. The vessel was purged with nitrogen and heated under normal pressure to 80° C., then under autogeneous pressure to 100° C. After 1 hour of reaction at 100° C., the mixture was cooled (over 1 hour) to 65° C.

The suspension was filtered and washed with 400 ml acetonitrile.

The filtrate was evaporated under reduced pressure (20 mm Hg), while heated to 140° C.

237.5 g of a liquid resin having the following characteristics were recovered:

| Viscosity measured at 25° C. | : | 180 poise |
|---|---|---|
| Epoxy content per 100 g | : | 0.494 |
| Chlorine content | : | 0.49% |

EXAMPLE 14

Into the apparatus described in Example 13, the following were introduced:
(i) 370 g (4 moles) epichlorohydrin,
(ii) 2.7 g (7.4 m.moles) tris-(3,6-dioxaoctyl)amine, and
(iii) 319 cm$^3$ acetonitrile.

The mixture was heated to 60° C. and 218 g (0.8 mole) anhydrous sodium bisphenate were added thereto. The vessel was purged with nitrogen and maintained under a pressure of 3 bars. The mixture was heated to 120° C., the pressure rising to 4.3 bars. After 30 minutes of reaction at 120° C., same was cooled to 74° C. over the course of 1 hour. The suspension was filtered and washed with 400 ml acetonitrile.

The filtrate was heated to 140° C. under reduced pressure (20 mm Hg). 221 g liquid resin were recovered having the following characteristics:

| Viscosity measured at 25° C. | : | 136 poise |
|---|---|---|
| Epoxy content per 100 g | : | 0.515 |
| Chlorine content | : | 0.38% |

EXAMPLE 15

Into the apparatus described in Example 13, the following were introduced:
(i) 370 g (4 moles) epichlorohydrin,
(ii) 2.7 g (7.4 m.moles) tris-(3,6-dioxaoctyl)amine, and
(iii) 377 cm$^3$ acetonitrile.

The mixture was heated to 60° C. and 218 g (0.8 mole) anhydrous sodium bisphenate were added thereto. The vessel was purged with nitrogen and maintained at a pressure of 3 bars. Same was heated to 100° C. and the pressure increased to 3.4 bars. After 1 hour of reaction at 100° C., the mixture was cooled to 65° C. over 10 minutes. The suspension was filtered and washed with 400 ml acetonitrile.

The filtrate was heated to 140° C. under reduced pressure (20 mm Hg). 167.4 g of a liquid resin having the following characteristics were recovered:

| Viscosity measured at 25° C. | : | 101 poise |
|---|---|---|
| Expoxy content per 100 g | : | 0.523 |
| Chlorine content | : | 0.34% |

While the invention has been described in terms of various preferred embodiments, the skilled artisan will appreciate that various modifications, substitutions, omissions and changes may be made without departing from the spirit thereof. Accordingly, it is intended that the scope of the present invention be limited solely by the scope of the following claims.

What is claimed is:

1. A process for the preparation of glycidyl polyethers of polyphenols which comprises reacting, in an anhydrous and essentially aprotic medium, at least one polyphenol alkali metal salt with at least one 2,3-epoxy-1-haloalkane in the presence of at least one compound of the formula $$N[CHR_1-CHR_2-O-(CHR_3-CHR_4-O)_n-R_5]_3 \quad (I)$$

wherein n is an integer from 0 to 10 inclusive; $R_1$, $R_2$, $R_3$, and $R_4$, which can be the same or different, are each a hydrogen atom or an alkyl radical having 1 to 4 carbon atoms; $R_5$ is selected from the group consisting of a hydrogen atom, an alkyl radical having 1 to 12 carbon atoms, a cycloalkyl radical having 3 to 12 carbon atoms, a phenyl radical, a radical of the formula

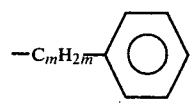

and a radical of the formula

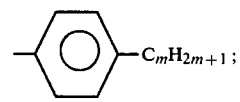

and m is an integer from 1 to 12 inclusive.

2. The process of claim 1 wherein the reaction is conducted in the presence of at least one compound of formula (I) wherein $R_1$, $R_2$, $R_3$ and $R_4$, which can be the same or different, are each a hydrogen atom or a methyl radical.

3. The process of claim 1 or 2 wherein the reaction is conducted in the presence of at least one compound of formula (I) wherein n is 1, 2 or 3 and wherein $R_5$ is a hydrogen atom or an alkyl radical having 1 to 4 carbon atoms.

4. The process of claim 1 wherein the reaction is conducted in the presence of at least one compound of formula (I) wherein n is 1, 2 or 3; $R_1$, $R_2$, $R_3$ and $R_4$ are each a hydrogen atom; and $R_5$ is a hydrogen atom or an alkyl radical having 1 to 4 carbon atoms.

5. The process of claim 1, 2 or 4 wherein the cation of the polyphenol alkali metal salt is selected from the group consisting of the cations of lithium, sodium, potassium and cesium and mixtures thereof.

6. The process of claim 3 wherein the cation of the polyphenol alkali metal salt is selected from the group consisting of the cations of lithium, sodium, potassium and cesium and their mixtures.

7. A process for the preparation of glycidyl polyethers of phenols which comprises, reacting, in an anhydrous and essentially aprotic medium, a potassium salt of at least one polyphenol with at least one 2,3-epoxy-1-haloalkane in the presence of at least one compound of the formula $$N[CHR_1-CHR_2-O-(CHR_3-CHR_4-O)_n-R_5]_3 \quad (I)$$

wherein $R_1$, $R_2$, $R_3$ and $R_4$ are each a hydrogen atom; $R_5$ is a hydrogen atom or an alkyl radical having 1 to 4 carbon atoms; and n is an integer from 2 to 10 inclusive.

8. The process of claim 7 wherein the reaction is conducted in the presence of tris(3,6,9-trioxadecyl)amine.

9. A process for the preparation of glycidyl polyethers of polyphenols which comprises reacting, in an anhydrous and essentially aprotic medium, a sodium salt of at least one polyphenol with at least one 2,3-epoxy-1-haloalkane in the presence of at least one compound of the formula $$N[CHR_1-CHR_2-O-(CHR_3-CHR_4-O)_n-R_5]_3 \quad (I)$$

wherein $R_1$, $R_2$, $R_3$ and $R_4$ are each a hydrogen atom; $R_5$ is a hydrogen atom or an alkyl radical having 1 to 4 carbon atoms; and n is an integer from 1 to 10 inclusive.

10. The process of claim 9 wherein the reaction is conducted in the presence of a compound of formula (I) selected from the group consisting of tris(5-hydroxy-3-oxapentyl)amine, tris(3,6-dioxaheptyl)amine, tris(3,6-dioxaoctyl)amine and tris(3,6,9-trioxadecyl)amine.

11. The process of claim 1, 2, 4, 7, 8, 9 or 10 wherein the polyphenol is a diphenol.

12. The process of claim 1, 2, 4, 7, 8, 9 or 10 wherein the polyphenol is selected from the group consisting of bisphenol A, bisphenol F, 2,2-bis(4-hydroxyphenyl)-1,1-dichloroethylene and 2,2-bis(3,5-dibromo-4-hydroxyphenyl)propane.

13. The process of claim 1, 2, 4, 7, 8, 9 or 10 wherein the polyphenol is selected from the group consisting of bisphenol A, bisphenol F and their mixtures.

14. The process of claim 1, 2, 4, 7, 8, 9 or 10 wherein the polyphenol is bisphenol A.

15. The process of claim 1, 2, 4, 7, 8, 9 or 10 wherein the 2,3-epoxy-1-haloalkane is selected from the group consisting of 1-chloro-2,3-epoxypropane, 1-bromo-2,3-epoxypropane, 1-chloro-2,3-epoxybutane, 1-chloro-2,3-epoxy-2-methylpropane and their mixtures.

16. The process of claim 1, 2, 4, 7, 8, 9 or 10 wherein the 2,3-epoxy-1-haloalkane is epichlorohydrin.

17. The process of claim 1, 7 or 9 wherein the reaction is conducted in the presence of from about 1 to about 13 moles of 2,3-epoxy-1-haloalkane per gram equivalent of the —O—(alkali metal) groups originating in the polyphenol alkali metal salt.

18. The process of claim 1, 7 or 9 wherein the reaction is conducted in the presence of from about 1 to about 5 moles of 2,3-epoxy-1-haloalkane per gram equivalent of —O—(alkali metal) groups originating in the polyphenol alkali metal salt.

19. The process of claim 1, 7 or 9 wherein from about 0.05 to about 5 equivalents of the compounds of formula (I) are used per 100 equivalents of —O—(alkali metal) groups deriving from the polyphenol alkali metal salt.

20. The process of claim 19 wherein from about 0.25 to about 2.5 equivalents of the compounds of formula (I) are used per 100 equivalents of —O—(alkali metal) groups.

21. The process of claim 1, 7 or 9 wherein the reaction is conducted in the presence of a polar, aprotic organic compound selected from the group consisting of acetonitrile, dimethylformamide, dimethylacetamide, dimethylsulfoxide, dipropylsulfoxide, propionitrile, benzonitrile, ethylene sulfide, N-methylpyrrolidone and tetramethylenesulfone.

22. The process of claim 21 wherein the polar, aprotic compound is acetonitrile.

23. The process of claim 21 wherein the reaction is conducted in the presence of from about 1 to about 3 moles of 2,3-epoxy-1-haloalkane per gram equivalent of —O—(alkali metal) groups originating in the polyphenol alkali metal salt.

24. The process of claim 23 wherein the polar, aprotic compound is acetonitrile.

25. The process of claim 1, 7 or 9 wherein the reaction is conducted at a temperature of from about 50° and about 150° C.

26. The process of claim 25 wherein the temperature is from about 80° to about 120° C.

* * * * *